US012661918B2

(12) United States Patent
Kobayashi

(10) Patent No.: US 12,661,918 B2
(45) Date of Patent: Jun. 23, 2026

(54) PRINTER AND SHEET SUPPORT DEVICE

(71) Applicant: Toshiba Tec Kabushiki Kaisha, Tokyo (JP)

(72) Inventor: Takeshi Kobayashi, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 57 days.

(21) Appl. No.: 18/519,535

(22) Filed: Nov. 27, 2023

(65) Prior Publication Data

US 2024/0326497 A1 Oct. 3, 2024

(30) Foreign Application Priority Data

Mar. 28, 2023 (JP) ................................. 2023-051319

(51) Int. Cl.

| | |
|---|---|
| ***B41J 35/02*** | (2006.01) |
| ***B41J 2/325*** | (2006.01) |
| ***B41J 15/02*** | (2006.01) |
| ***B41J 15/04*** | (2006.01) |
| ***B41J 29/13*** | (2006.01) |
| ***B41J 33/14*** | (2006.01) |

(52) U.S. Cl.

CPC ............... *B41J 35/02* (2013.01); *B41J 2/325* (2013.01); *B41J 15/02* (2013.01); *B41J 15/04* (2013.01); *B41J 29/13* (2013.01); *B41J 33/14* (2013.01)

(58) Field of Classification Search

CPC ... B41J 32/00; B41J 35/02; B41J 35/28; B41J 2/325; B41J 2/32; B41J 33/14; B41J 33/22; B41J 33/16; B41J 15/02; B41J 15/04

See application file for complete search history.

(56) References Cited

U.S. PATENT DOCUMENTS

| | | | |
|---|---|---|---|
| 5,938,350 | A | 8/1999 | Colonel |
| 2019/0176479 | A1 | 6/2019 | Yoshizawa et al. |
| 2020/0269617 | A1 | 8/2020 | Mori et al. |

FOREIGN PATENT DOCUMENTS

| | | | |
|---|---|---|---|
| JP | H07125366 | A | 5/1995 |
| JP | 2001205333 | A | 7/2001 |
| JP | 2007-229945 | A | 9/2007 |
| JP | 2012153438 | A | 8/2012 |
| JP | 2020-158283 | A | 10/2020 |
| WO | 2019065631 | A1 | 4/2019 |

OTHER PUBLICATIONS

Extended European Search Report mailed May 17, 2024 in corresponding European Patent Application No. 23216979.7, 9 pages.
Notice of Reasons for Refusal (First Office Action) mailed Dec. 16, 2025 in corresponding Japanese Patent Application No. 2023-051319, with English machine translation, 18 pages.

*Primary Examiner* — Kristal Feggins
(74) *Attorney, Agent, or Firm* — Kim & Stewart LLP

(57) ABSTRACT

According to an embodiment, a printer includes: a pair of support shafts that are supported by the casing, inserted into an inner periphery of an ink ribbon wound into a cylinder, and support the ink ribbon hung around a printing device. The printer further includes a driven shaft that is connected to one end of each of the support shafts so as to be movable along a longitudinal direction of the corresponding support shaft. The printer further includes a transmitter that is driven to rotate to transmits rotation to the driven shaft pressed by biasing of the biasing member.

9 Claims, 10 Drawing Sheets

PRINTER AND SHEET SUPPORT DEVICE

CROSS-REFERENCE TO RELATED APPLICATIONS

This application is based upon and claims the benefit of priority from the prior Japanese Patent Application No. 2023-51319, filed on Mar. 28, 2023, the entire contents of which are incorporated herein by reference.

FIELD

An embodiment to be described here generally relates to a printer and a sheet support device.

BACKGROUND

In the past, a printer that prints using an ink ribbon includes a pair of support shafts that support the ink ribbon. The support shafts are inserted into the cylindrical inner periphery of the wound ink ribbon and at least partially in close contact with the inner periphery. As a result, the ink ribbon is fed out (supplied) and rewound or wound up and rewound when the support shafts are driven to rotate.

Printers are desired for further space saving or miniaturization. In order to achieve this, it is necessary to reconsider various built-in parts and members, including their arrangement and structure.

Ink ribbons are sold in a wound state, and there are a plurality of different standards for the diameter of the inner periphery (inner diameter) depending on the manufacture or the like. For this reason, the support shaft that needs to be in close contact with the inner periphery is desired to be compatible with a plurality of standards.

However, the inner diameter greatly differs in some cases depending on the standard. In such a case, existing shafts whose diameters can be slightly increased or decreased are often unable to deal with such a problem.

DETAILED DESCRIPTION

According to an embodiment, a printer includes: a holding device; a printing device; a casing; a pair of support shafts; a driven shaft; a biasing member; and a transmitter. The holding device holds a wound strip of paper. The printing device prints paper pulled from the holding device. The casing contains the holding device and the printing device. The pair of support shafts are supported by the casing, inserted into an inner periphery of an ink ribbon wound into a cylinder, and supports the ink ribbon hung around the printing device. The driven shaft is connected to one end of each of the support shafts so as to be movable along a longitudinal direction of the corresponding support shaft. The biasing member biases the driven shaft in a direction away from the support shaft. The transmitter is provided to the casing and driven to rotate to transmits rotation to the driven shaft pressed by biasing of the biasing member.

Figure 1:
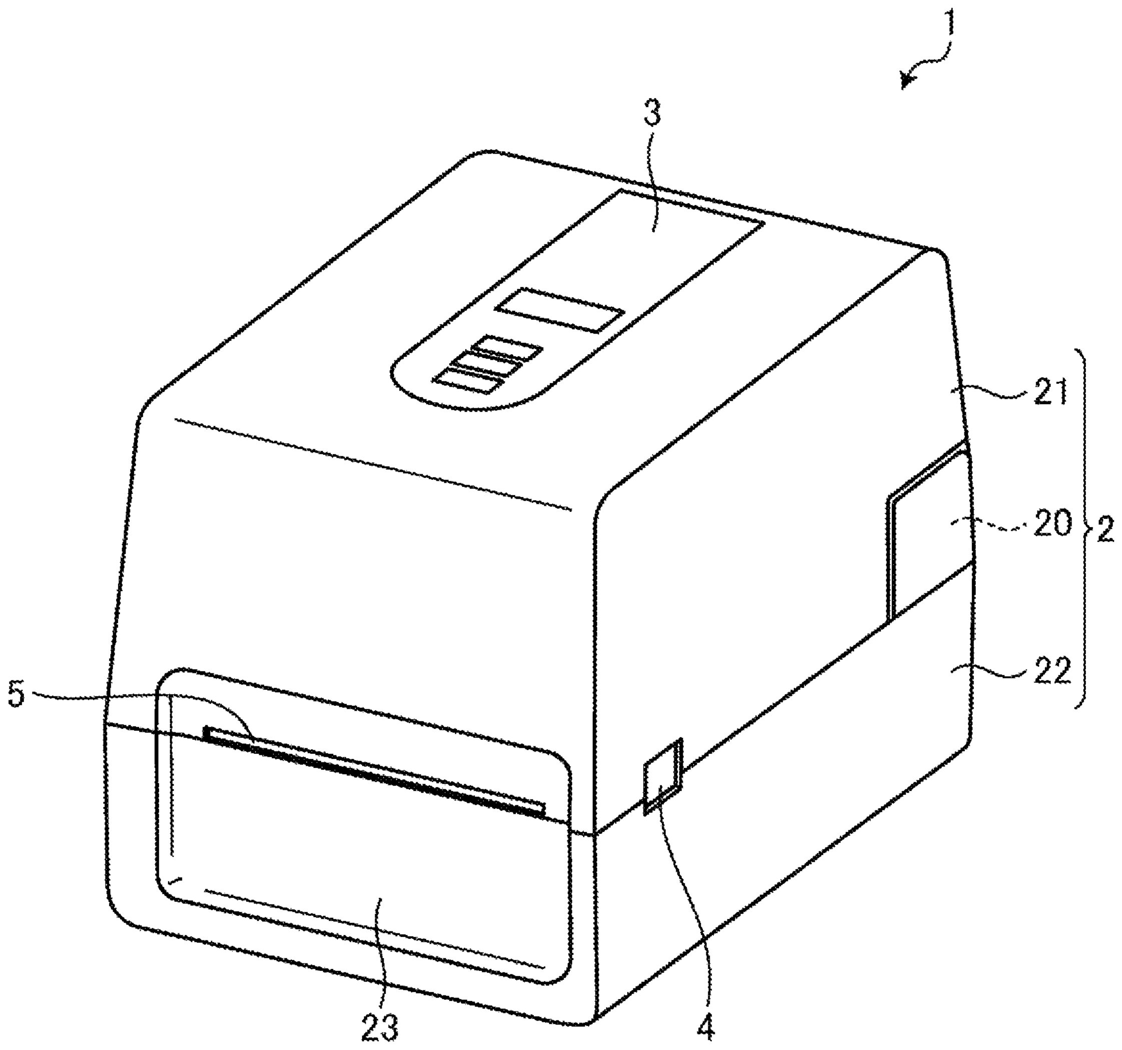
FIG. 1 is a perspective view showing an example of appearance of a printer according to an embodiment.

An embodiment will be described below with reference to the drawings. In the drawings, the same reference symbols denote the same or similar portions. FIG. 1 is a perspective view showing an example of appearance of a printer 1 according to an embodiment. The printer 1 includes a casing 2, a display operation device 3, an open/close button 4, and a paper ejection port 5. The side on which the paper ejection port 5 is provided is the front side of the printer 1, and the side opposite to the surface on which the paper ejection port 5 is provided is the back side of the printer 1.

The casing 2 is a box-shaped container, and includes an upper case 21 and a lower case 22. The upper case 21 includes an opening facing downward, and the lower case 22 includes an opening facing upward. The side of the upper case 21 on the back side is attached to the lower case 22 so as to be rotatable by a hinge 20. As a result, the upper case 21 and the lower case 22 are rotatably connected to each other, and open and close each other's openings as they rotate.

The hinge 20 rotatably connects the upper case 21 and the lower case 22 to each other on the back side. The hinge 20 includes a biasing member such as a torsion spring on one side of the lower case 22 in the width direction. The biasing member biases the upper case 21 in the direction of opening the lower case 22 to slow down the movement of the upper case 21 closing the lower case 22.

The display operation device 3 is provided on the upper surface of the upper case 21. The display operation device 3 receives inputs of various operations and displays various types of information. The open/close button 4 is provided on the front side of the side surface portion of the upper case 21. When the open/close button 4 is pressed, the lock state of the structure holding the upper case 21 at the position closing the lower case 22 is released, and the upper case 21 is lifted up in accordance with the biasing of the biasing member to open the casing 2.

Part of the front surface of the lower case 22 includes a front cover 23. The front cover 23 is an example of a cover portion. Further, portions of the casing 2 other than the front cover 23 are example of a body portion.

The paper ejection port 5 is an opening for issuing (ejecting) a printed product such as a receipt (printed paper 61) and is provided between the upper end portion of the front cover 23 and the front lower end portion of the upper case 21.

Figure 2:
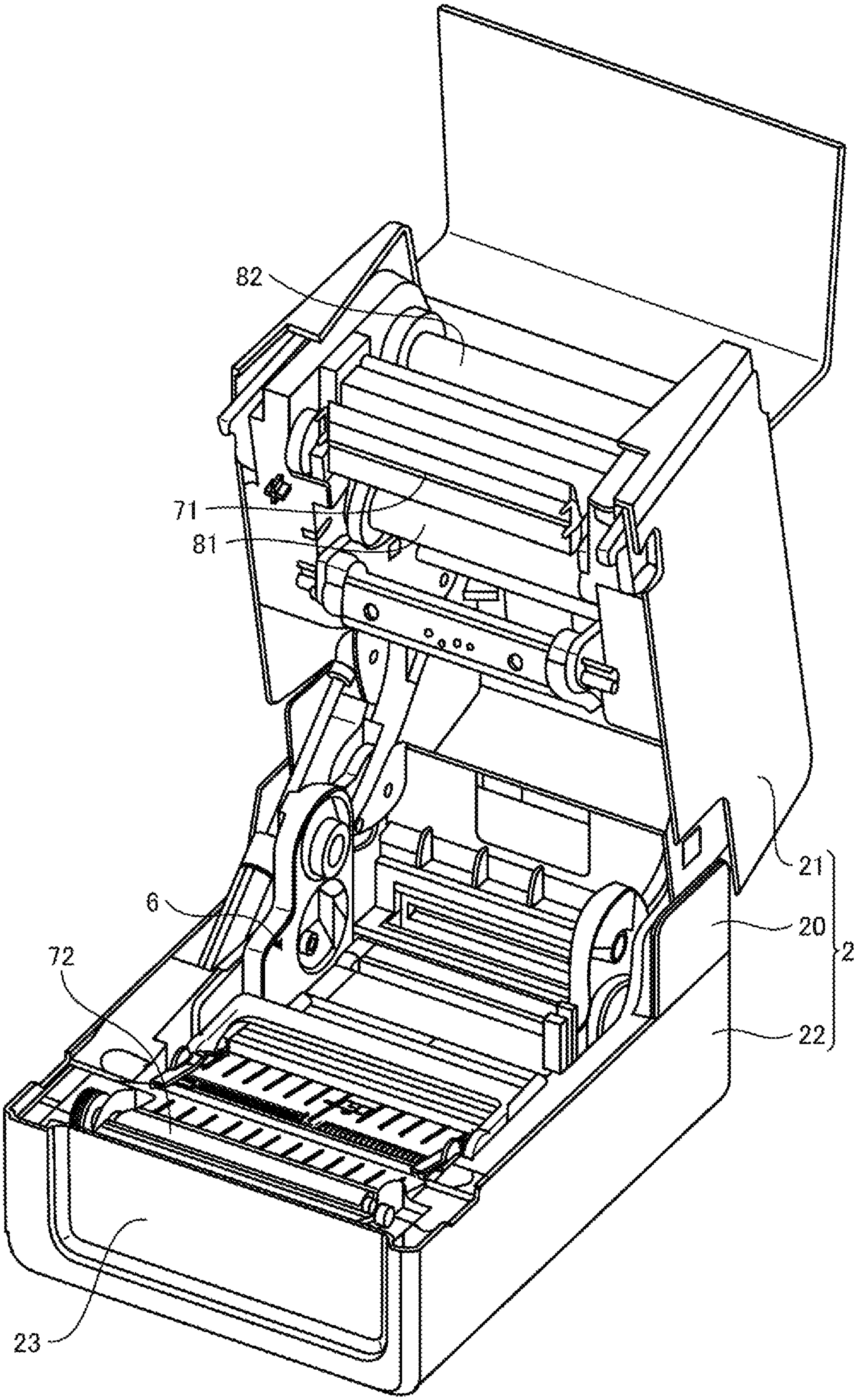
FIG. 2 is a perspective view showing an example of a state in which the printer according to the embodiment is opened.
Figure 3:
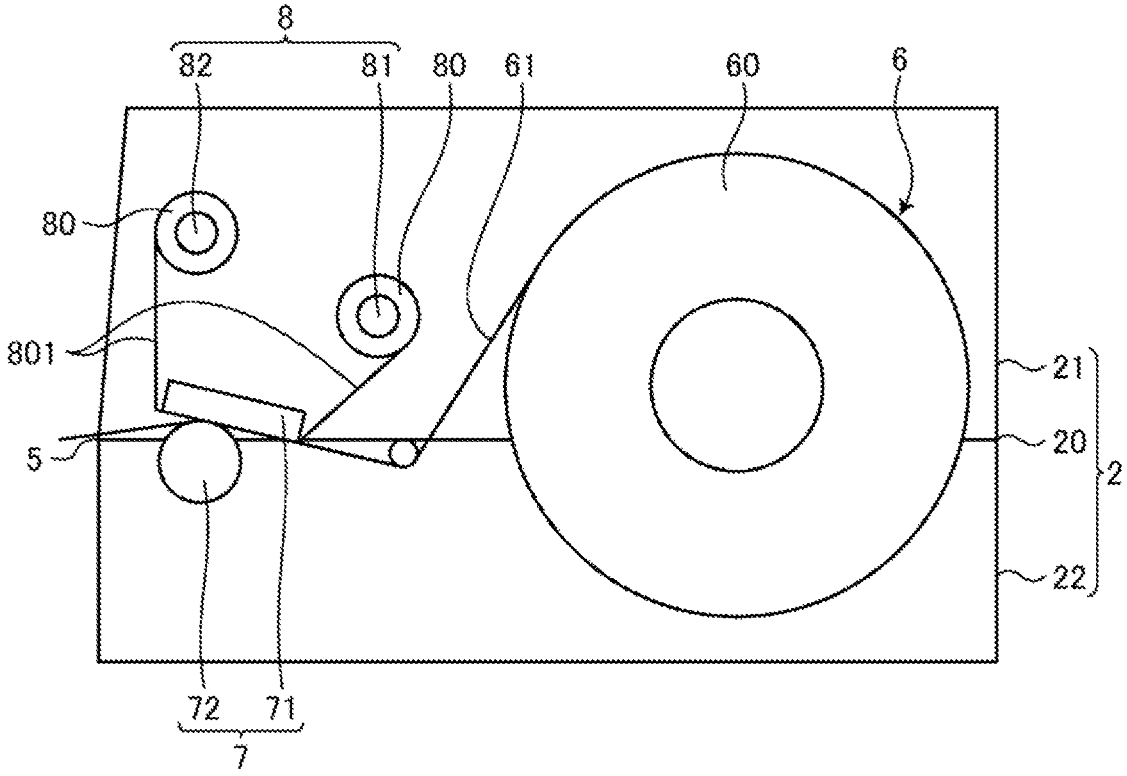
FIG. 3 is a schematic side view showing an example of a structure of the printer according to the embodiment.

FIG. 2 is a perspective view showing an example of a state in which the printer 1 according to the embodiment is opened. FIG. 3 is a schematic side view showing an example of a structure of the printer 1 according to the embodiment. In the casing 2, a paper holding device 6, a printing device 7, and a ribbon support device 8 are provided. The paper holding device 6 rotatably holds rolled paper 60 that is a strip of paper 61 wound.

Examples of the rolled paper 60 include a receipt roll and a label roll. The receipt roll is a strip of receipt paper (an example of the paper 61) wound. The receipt paper is the strip of paper 61 to be printed and cur to obtain a receipt.

The label roll is a strip of label (an example of the paper 61) wound. Examples of the label paper include a label with mounting paper, which is a label attached a strip of mounting paper, and a strip of label with no mounting paper. Note that an adhesive layer is provided on the back surface of the printing surface of the label.

The printing device 7 prints on the paper 61 while conveying the paper 61 pulled from the paper holding device 6, and includes a print head 71 and a platen roller 72. The print head 71 is fixed to the inner surface of the upper case 21 and in close contact with the platen roller 72 while the upper case 21 closes the opening of the upper surface of the lower case 22.

The print head 71 is, for example, a thermal head and includes a plurality of heating elements provided in parallel. The print head 71 prints on the paper 61 sandwiched between itself and the platen roller 72 by the heat of the heating elements. The platen roller 72 rotates when driving force of a stepping motor is transmitted thereto, and conveys the paper 61 sandwiched between the print head 71 and the platen roller 72.

The printer 1 performs printing by thermally transferring ink on the surface of an ink ribbon 801. The ink ribbon 801 is an example of a strip of sheet and is supported by the ribbon support device 8 while being wound. The ribbon support device 8 is an example of a sheet support device and includes support shafts 81 and 82. The support shaft 81 supports the unused wound ink ribbon 801 and rotates to supply or rewind the ink ribbon 801. The support shaft 82 is for winding up the used ink ribbon 801 and rotates to wind up or rewind the ink ribbon 801.

Each of the support shaft 81 and the support shaft 82 is supported at both ends by the inner wall of the upper case 21, and rotates when driving force is transmitted one end thereof.

Figure 4:
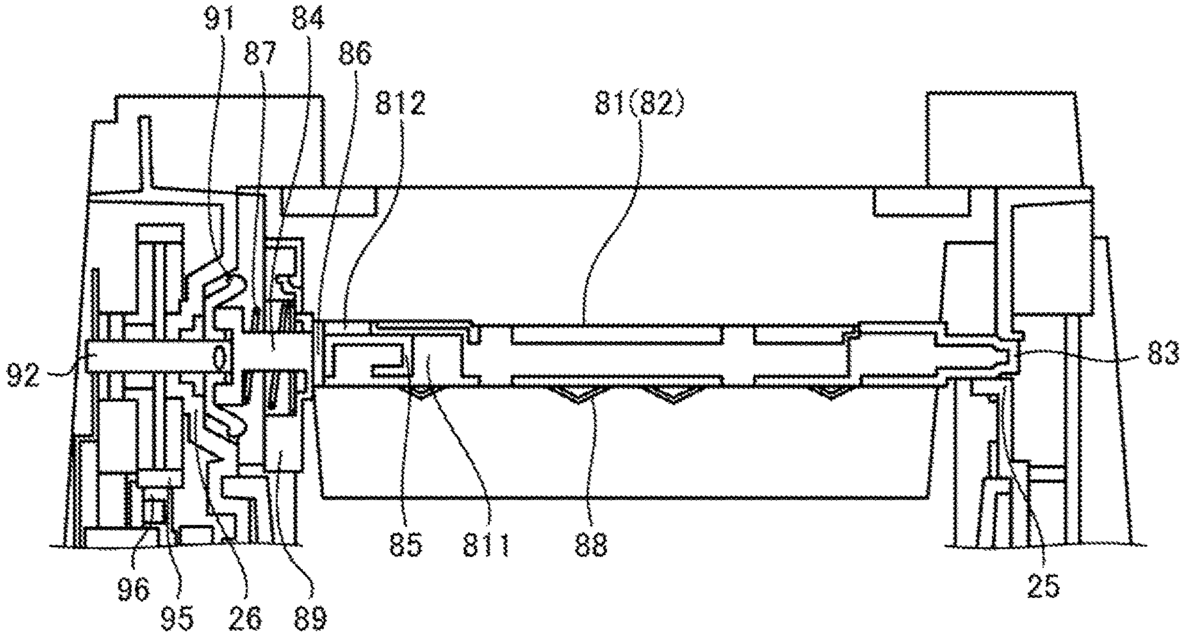
FIG. 4 is a front view showing how a support shaft according to the embodiment is attached to an upper case.

FIG. 4 is a front view showing how the support shaft 81 is attached to the upper case 21. Note that the attachment state of the support shaft 82 is the same as that of the support shaft 81. The following description of the support shaft 81 applies to the support shaft 82.

The upper case 21 includes support portions 25 and 26 on a pair of side walls forming the inner wall. The support portion 25 is a through hole into which one end portion 83 of the support shaft 81 is inserted. The end portion 83 is formed to be thinner than the central portion of the support shaft 81, which supports the wound ink ribbon 801 (ribbon roll 80). When the end portion 83 is inserted into the support portion 25, the support shaft 81 is rotatably supported by the upper case 21.

The support portion 26 is a through hole for rotatably supporting a rotation shaft 92 of a transmitter 91. A gear 95 is connected to the rotation shaft 92. Driving force of a motor or the like of the lower case 22 is transmitted to the gear 95 via another gear 96 or the like. As a result, the transmitter 91 is driven to rotate.

Figure 5:
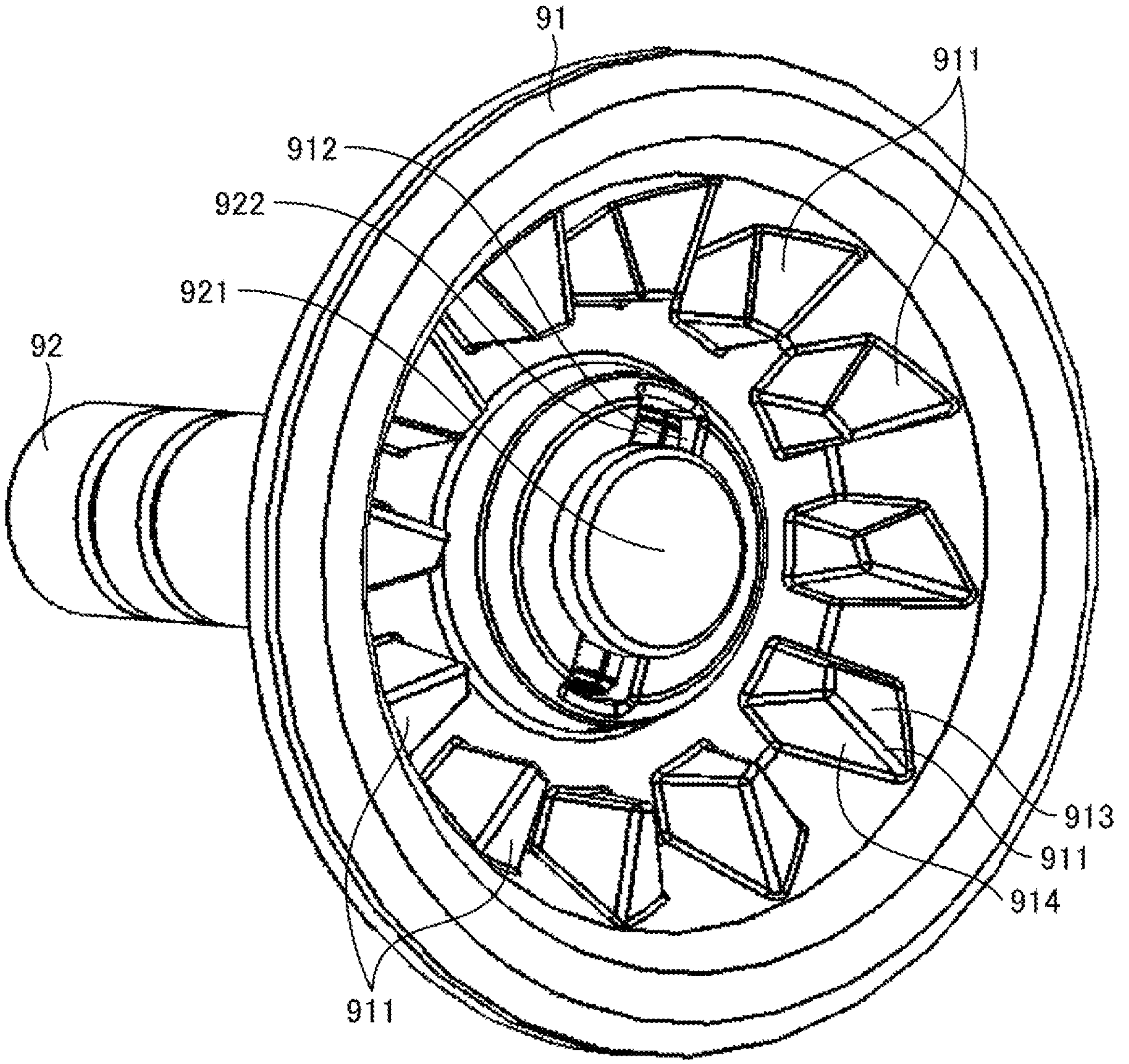
FIG. 5 is a perspective view showing appearance of a transmitter according to the embodiment.

FIG. 5 is a perspective view showing appearance of the transmitter 9. The transmitter 91 is a dish-shaped member with a central portion recessed than the edge portions, and includes a plurality of protruding portions 911 in the recess. A tip portion 921 of the rotation shaft 92 is inserted into the center of the transmitter 91. A pin 922 that is substantially orthogonally inserted into the tip portion 921 fits into a groove 912 in the center of the transmitter 91 to function as a rotation stopper for the rotation shaft 92 and the transmitter 91.

The protruding portions 911 are arranged along the edge of the transmitter 91 with gaps between them. These protruding portions 911 each include slopes 913 and 914 inclined with respect to the protrusion direction, and engage with an engagement shape portion 841 of a driven shaft 84 (described below) of the support shaft 81. This engagement allows driving force of a motor or the like to be transmitted to the support shaft 81 to cause the support shaft 81 to rotate.

Figure 6:
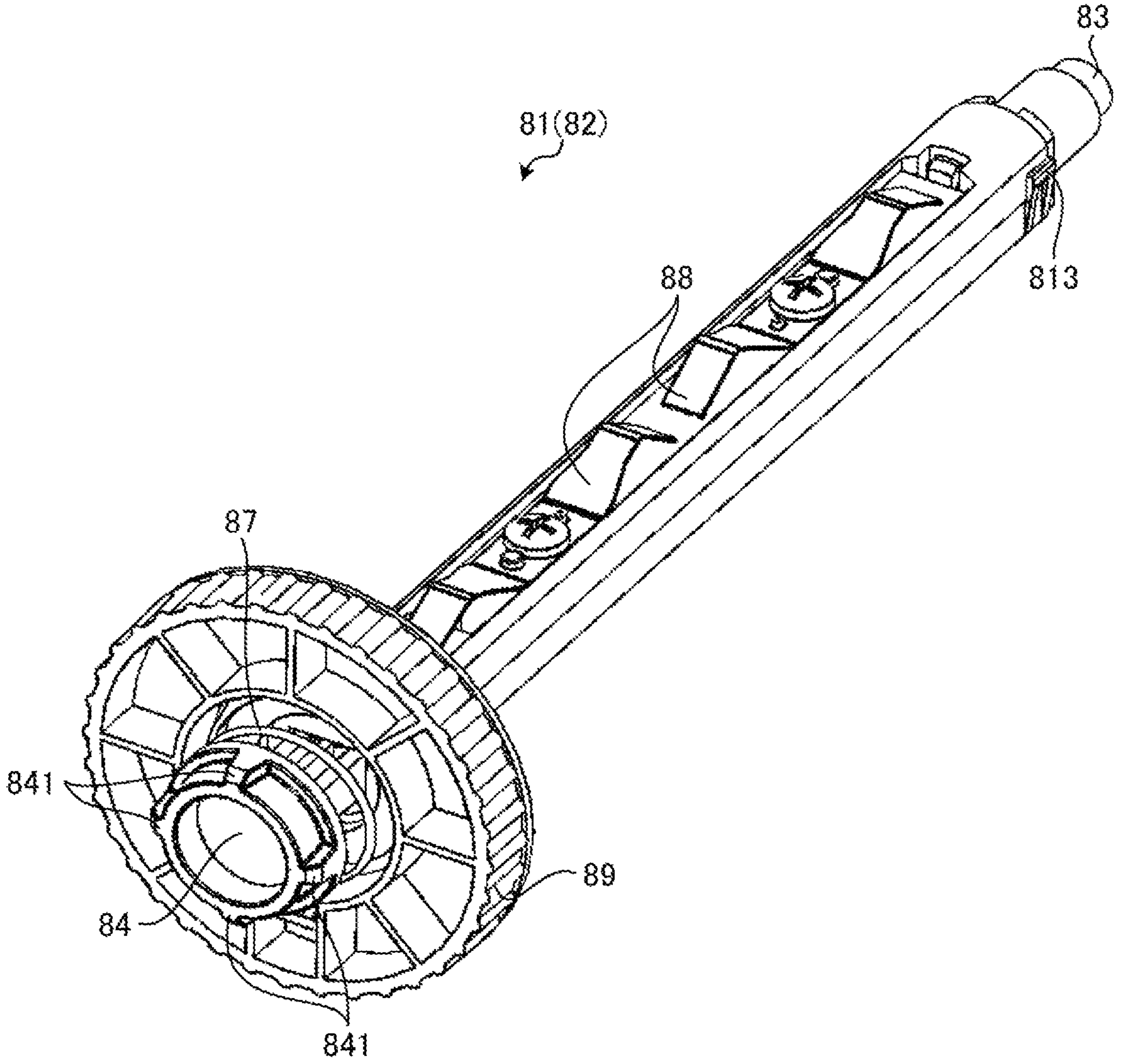
FIG. 6 is a perspective view showing appearance of the support shaft according to the embodiment.
Figure 7:
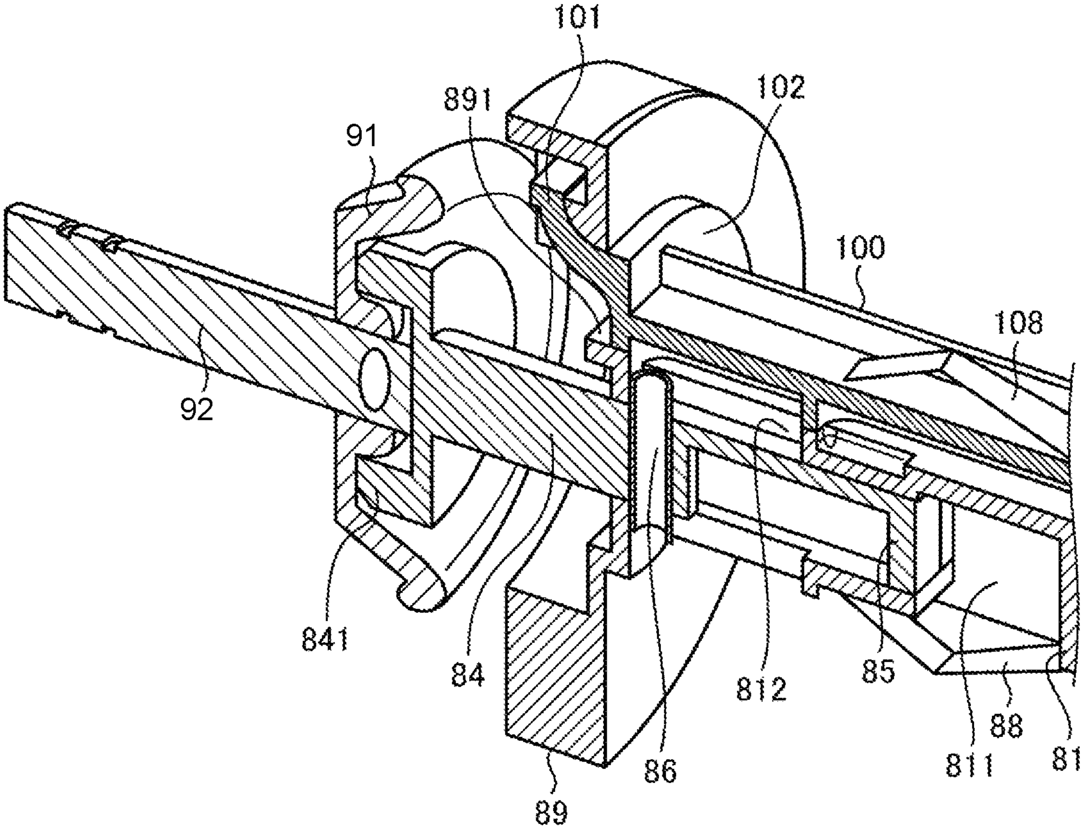
FIG. 7 is a perspective view showing the connection structure between the transmitter and the support shaft according to the embodiment in cross section.

FIG. 6 is a perspective view showing appearance of the support shaft 81. FIG. 7 is a perspective view showing the connection structure between the transmitter 91 and the support shaft 81 in cross section. The support shaft 81 includes the driven shaft 84, a slider 85, a rotation stopper 86, a biasing member 87, a compression contact member 88, and a rotation knob 89 at the end portion on the side opposite to the above-mentioned end portion 83.

The driven shaft 84 is provided at the tip of the support shaft 81. The engagement shape portion 841 is provided at the tip portion of the driven shaft 84. The engagement shape portion 841 has, for example, a recessed and projecting shape engaging with the protruding portions 911. When the transmitter 91 rotates while the protruding portions 911 and the engagement shape portion 841 engage with each other, rotation is transmitted to the driven shaft 84 to cause the support shaft 81 to rotate.

The slider 85 is movable in a guide groove 811 provided inside the support shaft 81 along the longitudinal direction thereof. The guide groove 811 is provided to be long along the axial direction of the support shaft 81. The slider 85 is provided integrally with the driven shaft 84. As a result, the driven shaft 84 is also movable along the longitudinal direction of the guide groove 811. That is, the driven shaft 84 is movable in a predetermined area along the axial direction of the support shaft 81.

The rotation stopper 86 is inserted into the driven shaft 84 and is substantially orthogonal to the axial direction of the driven shaft 84. A guide groove 812 that is a groove long in the axial direction and communicates with the guide groove 811 is formed in the support shaft 81. The end portion of the rotation stopper 86 fits into the guide groove 812. The rotation stopper 86 is movable along the guide groove 812. As a result, the driven shaft 84 does not rotate around the axis of the support shaft 81 while being movable along the axial direction of the support shaft 81.

The biasing member 87 is, for example, a compression spring provided between the end portions of the support shaft 81 and the driven shaft 84. The biasing member 87 biases the driven shaft 84 in the direction away from the support shaft 81. As a result, the driven shaft 84 is pressed by the transmitter 91 while being attached to the upper case 21. In this state, the engagement shape portion 841 of the driven shaft 84 and the protruding portions 911 of the transmitter 91 engage with each other, and rotation of the transmitter 91 is transmitted to the driven shaft 84.

The compression contact member 88 is, for example, a leaf spring provided on the circumferential surface of the support shaft 81. The compression contact member 88 is pressed by (in compression contact with) the inner periphery of the ribbon roll 80 while the support shaft 81 is inserted into the inner periphery of the wound ink ribbon 801 (ribbon roll 80). As a result, the ribbon roll 80 into which the support shaft 81 is inserted rotates integrally with the support shaft 81.

The rotation knob 89 is a disk-shaped portion that is located between the support shaft 81 and the driven shaft 84 and provided integrally with the support shaft 81. The rotation knob 89 has a shape with recesses and projections carved on the outer peripheral surface and accepts a manual operation of causing the support shaft 81 to rotate. The rotation knob 89 is used for, for example, adjusting, when replacing the ink ribbon 801, the tension of the ink ribbon 801 that is pulled from the ribbon roll 80 attached to the ribbon support device 8 and hung around the print head 71.

Figure 8:
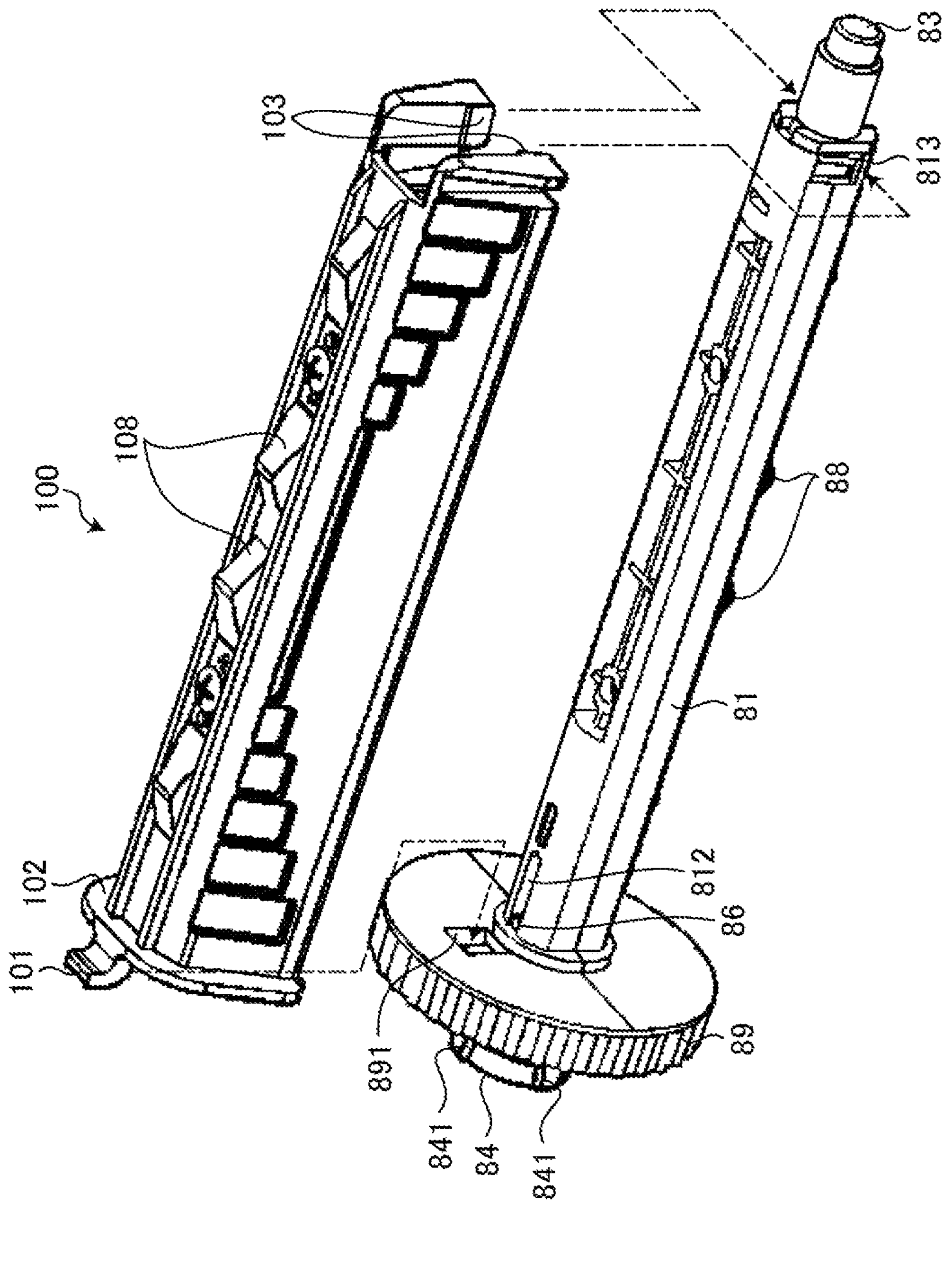
FIG. 8 is a perspective view showing the attachment structure of an attachment according to the embodiment to the support shaft.
Figure 9:
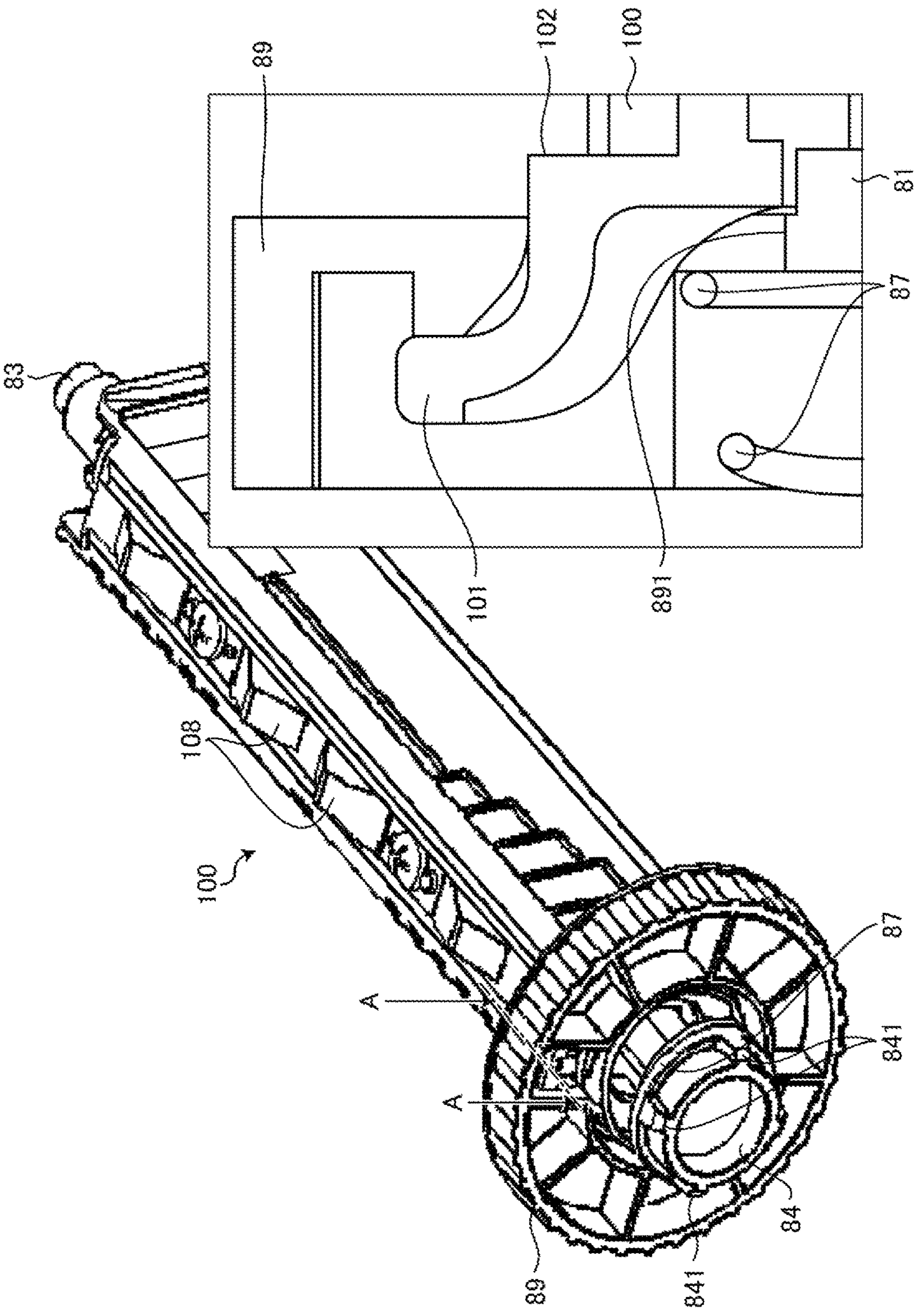
FIG. 9 is a diagram showing appearance of the support shaft to which the attachment according to the embodiment is attached and the hooking structure of the attachment on a rotation knob in cross section taken along the line A-A.
Figure 10:
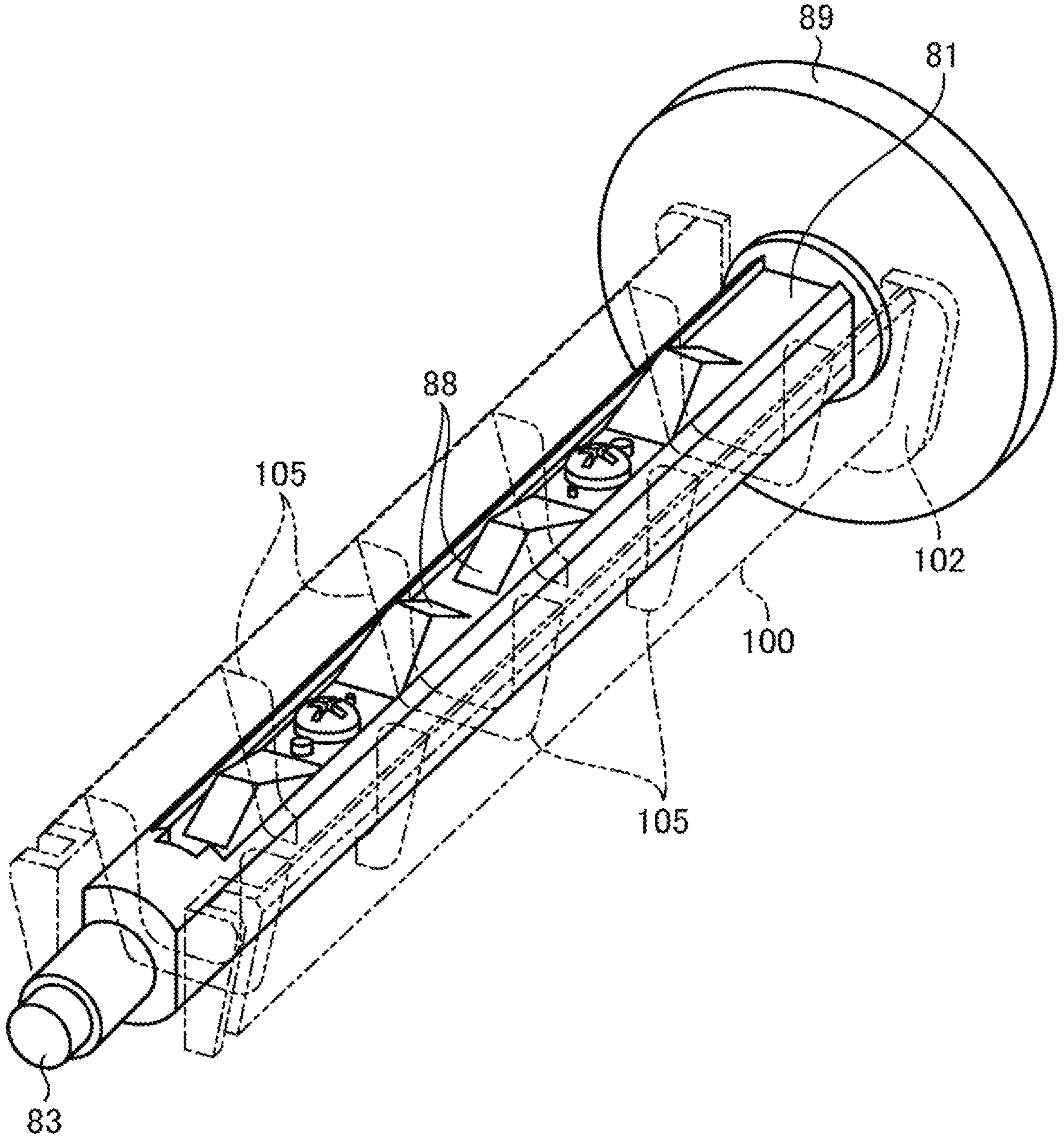
FIG. 10 is a diagram showing appearance of the support shaft to which the attachment according to the embodiment is attached.

An attachment 100 described next is being attached to the support shaft 81 shown in FIG. 7. FIG. 8 is a perspective view showing the attachment structure of the attachment 100 to the support shaft 81. FIG. 9 is a diagram showing appearance of the support shaft 81 to which the attachment 100 is attached and the hooking structure of the attachment 100 on the rotation knob 89 in cross section taken along the line A-A. FIG. 10 is a diagram showing appearance of the support shaft 81 to which the attachment 100 is attached, which is viewed from the side opposite to that shown in FIG. 9.

The attachment 100 is long in the longitudinal direction of the support shaft 81 and has a bent shape whose cross section in the thickness direction of the support shaft 81 is substantially U-shaped. The attachment 100 is attached to the support shaft 81 so as to cover the outer periphery of the support shaft 81 from the side where the compression contact member 88 of the support shaft 81 is not present (see, for example, FIG. 10). The attachment 100 includes an attachment portion 101 and a flange portion 102 at one end portion thereof and an attachment portion 103 at the other end portion.

The attachment 100 includes a compression contact member 108 at a position corresponding to the above-mentioned substantially U-shaped bent portion. The compression contact member 108 is similar to the compression contact member 88 and is pressed by (in compression contact with) the inner periphery of the ribbon roll 80.

The flange portion 102 is a flange-shaped portion spread in the radial direction from one end portion of the attachment 100 and is in contact with the circular surface of the rotation knob 89 while the attachment 100 is attached to the support shaft 81.

An attachment hole 891 is provided on the circular surface of the rotation knob 89. The attachment portion 101 is provided to protrude from the outer periphery portion of the flange portion 102 and is inserted into and hooked on the attachment hole 891.

The attachment portion 103 has a shape that protrudes from a pair of U-shaped end portions in a direction toward each other. Meanwhile, an engagement portion 813 (see FIG. 6 and FIG. 8) is provided to the support shaft 81 at a position corresponding to the attachment portion 103. The engagement portion 813 has a hooking surface substantially orthogonal to the outer surface of the support shaft 81 and an inclined guide surface leading to the outer surface of the support shaft 81 from the tip of the hooking surface, and leads the attachment portion 103 to the tip of the hook surface by the guide surface. When the attachment portion 103 goes beyond the tip, the attachment portion 103 engages with the engagement portion 813.

With the attachment portion 101 and the attachment portion 103 described above, the attachment 100 is hooked on the support shaft 81 and is attached to the support shaft 81 while covering the outer periphery of the support shaft 81.

Note that the side of the attachment 100 facing the support shaft 81 is embedded by a plurality of U-shaped ribs 105 arranged along the longitudinal direction of the support shaft 81.

With such a configuration, the paper 61 pulled from the paper holding device 6 is printed by the printing device 7 and ejected from the paper ejection port 5. The printing device 7 holds and sandwich the paper 61 and the ink ribbon 801 between the print head 71 and the platen roller 72 and prints by the print head 71 while conveying them by rotation of the platen roller 72. The print head 71 melts ink of the ink ribbon 801 and transfers the ink onto the paper 61.

The support shaft 81 supplies (feeds out) the ink ribbon 801. The support shaft 82 winds up the ink ribbon 801 that has gone through the print head 71. The support shafts 81 and 82 are caused to rotate backwards as necessary, and the ink ribbon 801 is conveyed backward.

Driving force of a motor or the like is transmitted to the support shaft 81 (the same applies to the support shaft 82) via the driven shaft 84 and the transmitter 91, and the support shaft 81 rotates thereby.

The driven shaft 84 is pressed by the transmitter 91 by biasing of the biasing member 87. When the engagement shape portion 841 and the protruding portions 911 are engaged with each other in this state, the driven shaft 84 rotates in accordance with the rotation of the transmitter 91.

The motor or the like is housed in the lower case 22 of the printer 1 and is linked by the gears 95 and 96 or the like to cause the transmitter 91 to rotate. The structure for causing the transmitter 91 and the driven shaft 84 to be in compression contact with each other is housed in the support shaft 81. That is, the slider 85, the guide groove 811, the rotation stopper 86, the guide groove 812, and the biasing member 87 are provided to the support shaft 81.

As a result, since it is unnecessary to provide the structure corresponding to these (the slider 85, the rotation stopper 86, the biasing member 87, the guide groove 811, and the guide groove 812) on the side of the printer 1, it is possible to achieve space saving and miniaturization inside the printer 1. In addition, although the structure (the slider 85, the rotation stopper 86, the biasing member 87, the guide groove 811, and the guide groove 812) that has not been present in the past is added to the support shaft 81, the portion is a portion inside the support shaft 81 that has been dead space, and thus there is no problem as it does not take up more space.

The support shaft 81 is in close contact with the cylindrical inner periphery of the ribbon roll 80 or the attachment 100 attached to the support shaft 81 is in close contact with the cylindrical inner periphery of the ribbon roll 80. The support shaft 81 is in close contact with the inner periphery of the ribbon roll 80 by the pair of compression contact members 88 arranged along the longitudinal direction. The attachment 100 is in close contact with the inner periphery of the ribbon roll 80 by a pair of sides corresponding to both U-shaped end portions and the compression contact member 108 provided at a position corresponding to the U-shaped bent portion.

The attachment 100 is attached at both end portions of the support shaft 81 by hooking structures in which the orientation of action in the hooking operation differs.

One of the hooking structures of the attachment 100 and the support shaft 81 is a hooking structure by the attachment portion 101 and the attachment hole 891 with the hooking direction substantially along with the axial direction of the support shaft 81. The other of the hooking structures of the attachment 100 and the support shaft 81 is a hooking structure by the attachment portion 103 and the engagement portion 813 with the hooking direction substantially orthogonal to the axial direction of the support shaft 81.

By attaching the attachment 100 to the support shaft 81 with the two hooking structures in which the orientation of action differs as described above, it is possible to easily attach/detach the attachment 100 and prevent the attachment 100 from falling off due to rotation of the support shaft 81.

According to the configuration of this embodiment described above, it is possible to provide a structure capable of achieving further space saving or miniaturization in the printer 1.

In addition, according to this embodiment, it is possible to deal with the inner diameter of the ribbon roll 80, which differs depending on the standard, by appropriately using the attachment 100.

In the printer 1 according to this embodiment, the function that has been carried out by the lower case 22 (or the upper case 21) is provided to the support shaft 81. As a result, it is possible to achieve space saving in the casing 2 and miniaturization of the printer 1. Meanwhile, the production cost of the support shaft 81 with the complicated structure increases. For this reason, if the support shaft 81 that matches the inner diameter of the ribbon roll 80 depending on the standard is prepared, the cost will increase. In this embodiment, since the attachment 100 is capable of dealing with the difference of the inner diameter depending on the standard, it is possible to reduce the cost.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer, comprising:
a holding device that holds a wound strip of paper;
a printing device that prints paper pulled from the holding device;
a casing that contains the holding device and the printing device;
a pair of support shafts that are supported by the casing, inserted into an inner periphery of an ink ribbon wound into a cylinder, and support the ink ribbon hung around the printing device;
a driven shaft that is connected to one end of each of the support shafts so as to be movable along a longitudinal direction of the corresponding support shaft;
a biasing member that biases the driven shaft in a direction away from the support shaft;
a transmitter that is provided to the casing and driven to rotate to transmit rotation to the driven shaft pressed by biasing of the biasing member; and
an attachment that is attachable/detachable to/from the support shaft, is long in the longitudinal direction of the support shaft, and covers an outer periphery of the support shaft.

2. The printer according to claim 1, wherein
the attachment includes a bent portion whose cross section orthogonal to the longitudinal direction is substantially U-shaped.

3. The printer according to claim 2, wherein
the attachment includes a compression contact member that is provided on an outer periphery of the bent portion and is in compression contact with the inner periphery of the ink ribbon.

4. The printer according to claim 3, wherein
the support shaft includes a compression contact member that is in compression contact with the inner periphery of the ink ribbon, and
the attachment covers the support shaft from a side where the compression contact member of the support shaft is not present.

5. The printer according to claim 1, wherein
the support shaft includes a compression contact member that is in compression contact with the inner periphery of the ink ribbon, and
the attachment covers the support shaft from a side where the compression contact member is not present.

6. The printer according to claim 5, wherein
the attachment includes a compression contact member that is in compression contact with the inner periphery of the ink ribbon.

7. A sheet support device, comprising:
a support shaft that is inserted into an inner periphery of a strip of sheet wound into a cylinder and supports the sheet; and
an attachment that is attachable/detachable to/from the support shaft, long in a longitudinal direction of the support shaft, and covers an outer periphery of the support shaft.

8. The sheet support device according to claim 7, wherein
the support shaft includes a compression contact member that is in compression contact with the inner periphery of the sheet, and
the attachment covers the support shaft from a side where the compression contact member is not present.

9. The sheet support device according to claim 8, wherein
the attachment includes a bent portion whose cross section orthogonal to the longitudinal direction is substantially U-shaped and a compression contact member that is provided on an outer periphery of the bent portion and is in compression contact with an inner periphery of an ink ribbon.

* * * * *